Patented Dec. 3, 1935

2,022,729

UNITED STATES PATENT OFFICE 2,022,729

STABLE COLLOIDAL SOLUTION OF IODINE

William M. Malisoff, Philadelphia, Pa., assignor, by mesne assignments, to Mackie-Henkels, Inc., Philadelphia, Pa., a corporation of Pennsylvania No Drawing. Application July 19, 1933, Serial No. 681,163

8 Claims. (Cl. 252—6)

In the employment of iodine as an antiseptic or for any particular medical purpose the use of an aqueous colloidal solution or dispersion associated with colloidal solution is highly desirable. Such solutions may be expected to be non-irritating, more active and at the same time less toxic than alcoholic tinctures, and the like. At the same time it is a prime requisite that such solutions remain stable during the period following manufacture and preceding actual medical use. In iodometry dispersions of iodine or starch serve as indication of the progress of certain reactions, and it is possible that the idea of using such dispersions medically may have occurred to some one. Nevertheless, these dispersions are not stable and are not useful. The color fades, precipitation occurs, or side-reactions occur, according to conditions. On the other hand definite medical use has been made of the insoluble, undispersed reaction product of starch with iodine in high concentration, a brownish powder which shows slight dispersion only when wetted.

I have discovered a method and means of preparing a stable, colloidal dispersion of iodine in water which will not precipitate nor will require being put up in insoluble solid or semi-solid form, as the traditional starch-iodine complex. For this purpose I submit starch, which may originate from any vegetable source, to a preliminary fractionation designed to separate undesirable ingredients, to wit, a group of amylopectins and substances other than the amyloses. The amyloses are preferably further fractionated into the alpha and beta forms. The former is used as the colloid dispersing and adsorbing medium for dispersing the iodine in water.

I do not wish to restrict myself to any particular method of separation, since the spirit of my invention is to embody the discovery that alpha amylose no matter how obtained will form a stable dispersion with iodine, hitherto not conceived of or employed for medical purposes, possessing the distinct advantage of constancy of composition through long periods of time, uniformity, standardizability for pharmacopoeia specifications, and smoothness and reliability in use clinically.

As an example only I will indicate that the pectinic impurities may be separated by boiling up starch in water and filtering through clay, kaolin, bentonite, paper pulp, filter-cell, silica gel, or similar materials. The amyloses may be separated by electrophoresis at selective rates, for instance continuously in a 3-compartment electrolytic cell. Thus one obtains substantial but not complete freedom from phosphorus compounds as well. Conditions are set for obtaining the fraction of highest specific optical rotation (about 195°), and lack of precipitation with alcohol in the absence of electrolytes. I prefer to use this fraction to form a dispersion of 0.5–2% by weight of alpha amylose. This is readily accomplished by heating. This solution will disperse free iodine on agitation directly from the solid or from a solution of the same in iodides. The presence of a small amount of iodides and/or of chlorides may be of use, should one wish to form an isotonic solution containing some sodium chloride or the like. The stability remains unaffected. For most therapeutic purposes it is sufficient to introduce 0.1 to 0.2% of iodine only, forty percent of which may be in the form of iodides which up to this concentration do not depress the stability.

What I claim is:

1. A method for producing a stable colloidal dispersion of iodine consisting of agitating free iodine with a dispersion of alpha amylose and starch residues substantially free of beta amylose.

2. A method for producing a stable coloidal dispersion of iodine consisting of agitating free solid iodine with a dispersion of alpha amylose and starch residues substantially free of beta amylose.

3. A method for producing a stable colloidal dispersion of iodine consisting of agitating free iodine in a solution of iodides with a dispersion of alpha amylose and starch residues substantially free of beta amylose.

4. A composition of matter comprising a stable colloidal dispersion of iodine in water by the agitation with free iodine of alpha amylose and starch residues substantially free of beta amylose.

5. A method for producing a stable colloidal dispersion of iodine consisting of agitating free iodine with a dispersion of substantially .5% to 2% by weight of alpha acylose and starch residues substantially free of beta amylose.

6. A composition of matter comprising a stable colloidal dispersion of iodine in water by the agitation of a dispersion of substantially .5% to 2% by weight of alpha amylose and starch residues substantially free of beta amylose with free iodine of substantially .1% to .2% concentration.

7. A method for producing a stable colloidal dispersion of iodine consisting of agitating free iodine with a colloid dispersing and adsorbing medium consisting essentially of alpha amylose substantially free of beta amylose.

8. A composition of matter comprising a stable colloidal dispersion of iodine in water by the agitation of free iodine with a colloid dispersing and adsorbing medium consisting essentially of alpha amylose substantially free of beta amylose.

WILLIAM M. MALISOFF.